Oct. 19, 1937.   D. D. CRANDELL   2,095,969
METHOD AND APPARATUS FOR PREVENTING DUST DEPOSITION
Filed Feb. 20, 1935
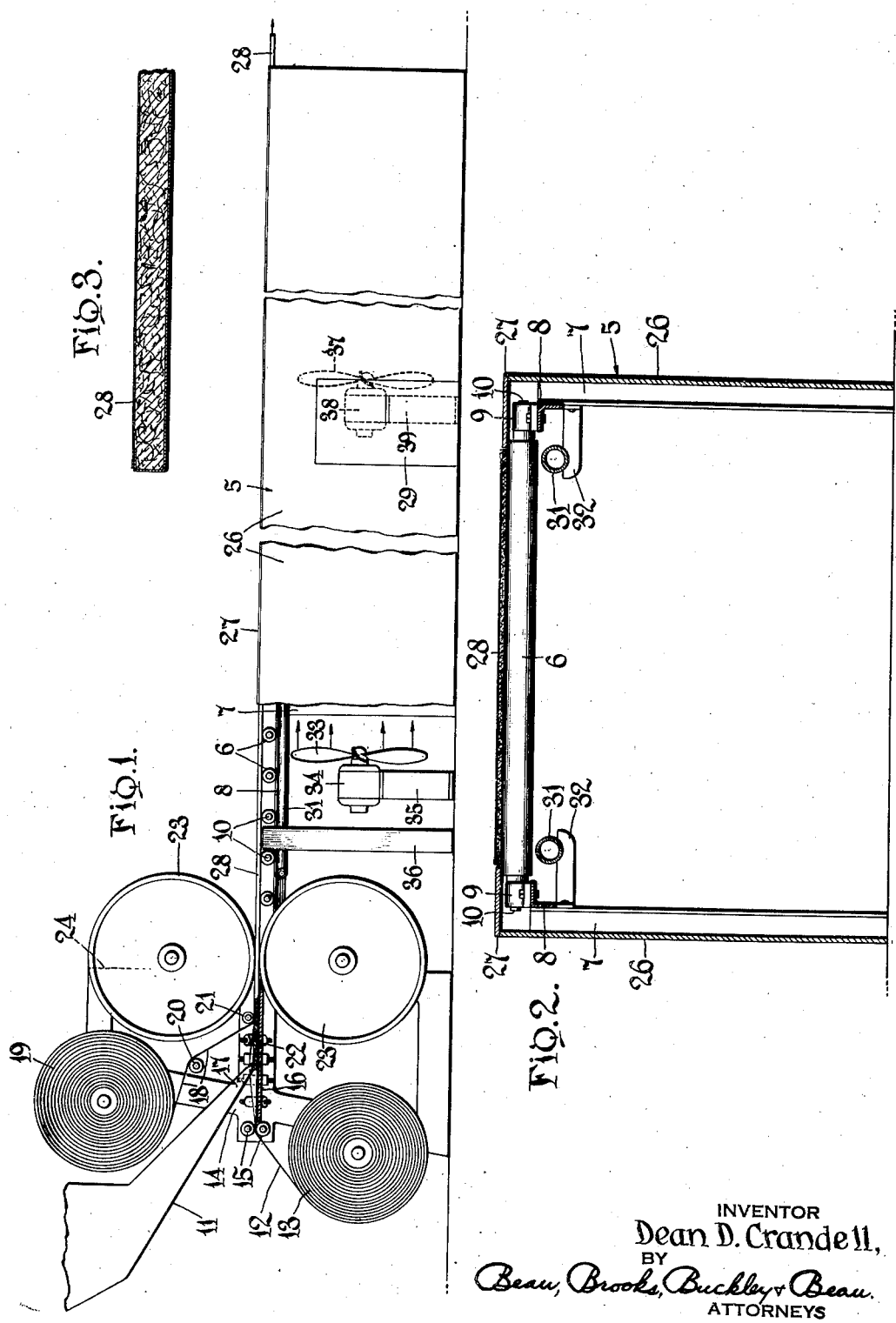
INVENTOR
Dean D. Crandell,
BY
Beau, Brooks, Buckley & Beau.
ATTORNEYS Patented Oct. 19, 1937

2,095,969

UNITED STATES PATENT OFFICE 2,095,969

METHOD AND APPARATUS FOR PREVENTING DUST DEPOSITION

Dean D. Crandell, Buffalo, N. Y., assignor to National Gypsum Company, Buffalo, N. Y., a corporation Application February 20, 1935, Serial No. 7,457

7 Claims. (Cl. 34—12)

This invention relates to an apparatus for and a method of producing plaster board.

In the manufacture of plaster board, a gypsum or plaster mix is generally prepared in a mixing tank and fed by suitable discharging and distributing means onto a lower paper sheet, carried under caliper rolls, the lower paper sheet scored and folded to produce the edge portions of the finished board and an upper paper sheet laid over the in-turned sides of the lower sheet to form a gypsum or plaster board enclosed in paper.

The plaster board upon discharge from the caliper rolls advances upon a run-way and during such advancement crystallization or setting is initiated.

Plaster board as presently manufactured advances upon the run-way face side down, the face side of the board coming in contact with the roller mechanism of the run-way whereby the face side is prone to injury, greatly increasing the number of seconds due to the scratching of the face by dust, powdered gypsum and other extraneous material that may collect either upon the rollers or upon the face of the board. After passage of the board through the caliper rolls crystallization begins and the heat of the crystallization process increases the rate of evaporation of water from the damp set mix thus driving a portion of water from the board; the face sheet, therefore, becomes moistened due to evaporation of the excess water contained in the gypsum mix. This moist condition of the face sheet causes the dry dust particles and the like to adhere to the face sheet and to the rollers of the run-way, moistened by contact with the plaster board, and induces excessive scratching and even puncturing of the face sheet, giving rise to a large quantity of product that must be sold as seconds.

The present invention provides an apparatus for eliminating dust deposition upon the rollers and the face sheet of plaster board; provides an apparatus that produces a minimal quantity of plaster board not of the first grade; provides an apparatus that prevents excessive accumulation of moisture upon the face of the plaster board and upon the mechanism of the run-way; provides an apparatus that may be used to regulate the rate of crystallization or setting of the plaster board.

The invention further comprehends a method of manufacturing plaster board wherein dust deposition upon the plaster board is materially reduced and substantially eliminated, and provides a method of controlling the rate of crystallization of the gypsum of the plaster board.

In the drawing wherein one embodiment of the invention is shown, Fig. 1 is a vertical section taken longitudinally of the device with certain parts in elevation, Fig. 2 is a vertical section taken transversally of the device with certain parts shown in elevation, and Fig. 3 shows a fragmentary section of plaster board.

Referring more particularly to the drawings, a plaster board machine is shown wherein a runway is illustrated at 5 equipped with the usual rollers 6 upon which the formed boards are advanced toward a drying device not shown. Runway 5 comprises standards or supporting uprights 7 having roller supporting members, such as the angle irons 8 attached thereto in any convenient fashion adjacent the upper ends thereof. Angle irons 8 have attached thereto and support bearing members 9 in which pins 10 of roller members 6 are journaled for easy rotation.

In preparing plaster board, including wall board, lath, and the like, a cementitious mix generally of plaster and water, in a plastic condition is fed into chute 11 from a mix tank (not shown), and is distributed upon the lower or facing sheet 12 of the finished board, the facing sheet being fed from the sheet roll 13, supported in any conventional manner, as upon the up-right 14, to the guide and tensioning rolls 15, and thence upon the supporting table or apron 16. The lower or face sheet, after being scored adjacent the outer side edges to permit overlapping and turning of the sheet to form the sides of the plaster board, is turned upwardly and over upon the plastic mix being fed upon the lower face sheet 12 from the discharge and distributing nozzle 17 of chute 11.

Upper sheet roll 19 is supported upon a suitable support member such as up-right 14, and feeds the upper or backing sheet 18 to tensioning roll 20 and under the layering roll 21 upon the distributed plaster mix 22. The un-calipered plaster board, comprising the lower or face sheet 12 up-turned a distance equal to the thickness desired in the finished board and then in-turned and having the plastic mix fed thereon and the upper or backing sheet 18 laid upon the in-turned side edges of lower sheet 12 and upon the exposed plastic filling or core, passes under caliper rolls 23 supported for calipering adjustment upon the supporting up-right 24. After passage of the pre-formed board through caliper rolls 23, the board is advanced upon rollers 6 of run-way 5 toward the drying kilns.

To prevent precipitation of dust and other extraneous matter upon rollers 6, and to prevent collection of such material upon the moist face or lower sheet 12 of the plaster board and thus prevent scratching or marring of the face surface of the finished board, run-way 5 is enclosed in any convenient fashion and by means of any convenient enclosing means. In the embodiment of the invention shown in the drawing, the enclosure comprises the longitudinally extending upright side members 26 that may be formed of plaster board or any suitable enclosing or structural means capable of forming a substantially tight and continuous side enclosure extending substantially the whole length of run-way 5. It is desirable that the ends of rollers 6, the attached pins 10, and journals 9 be protected from the deposition of dust thereon, and to this end inwardly extending top pieces 27 extend from the top of the side enclosures 26 over journals 9 and the ends of the rollers 6, and terminate adjacent the edges of the finished plaster board 28 being advanced upon run-way 5.

To permit access to the under portion of the run-way, access doors 29 are formed at convenient locations in the side enclosure 26. To prevent collection of moisture upon rollers 6 and upon the face sheet of board 28, and to prevent the deposition and collection of dust and the entrainment thereof in the moisture wetting, seeping through and condensing upon the face sheet, means are provided for regulating the temperature of the atmosphere in contact with the rollers and the face of board 28 and further means are provided for circulating such atmosphere over these members to facilitate evaporation of moisture therefrom and at the same time by regulating the rate of evaporation of such moisture to regulate the temperature of the plaster board and its rate of setting.

In the embodiment of the invention shown in the drawing, steam pipes 31 are mounted within the interior of the enclosing members 26 and 27 and may be mounted upon supporting standards 32 carried upon up-rights 7. Any convenient heating means, such as exhaust steam and the like, may be circulated through pipes 31 to raise the temperature of the atmosphere contained within the enclosed run-way for causing evaporation of moisture from rollers 6 and the face of plaster board 28. The temperature of the atmosphere in contact with these members can be regulated to produce the desired degree of evaporation of moisture from the plaster board and thus control crystallization of the gypsum. By thus regulating the temperature of the atmosphere, the apparatus and method of the present invention can be advantageously used during periods of low temperature or of high humidity to regulate the crystallizing or setting time.

To provide for a substantially continuous replacement of the atmosphere within the enclosed run-way, gas propelling means are provided for moving the air therewithin and discharging the air therefrom while at the same time a fresh supply of air is admitted within the confines of the enclosed run-way.

In the embodiment of the invention shown in the drawing, a propeller fan 33 actuated by motor 34 and supported upon standard 35, is placed within the enclosure and adjacent the forward or front end thereof for causing movement of air within the enclosure in the direction of movement of the board 28. To prevent the entrance of dust with the incoming air, an air filter is placed within the open and forward end of the enclosed runway and substantially transversely thereof, whereby incoming air is caused to pass through the filter 36 so that air is delivered into the enclosure substantially free of suspended impurities. The air filter, depending upon the particular mill or the particular circumstances of manufacture can be either a wet or a dry filter of any conventional and suitable type.

The movement of air caused by rotation of fan 33 causes the air within the enclosure to pass over steam pipe 31 increasing the temperature of the air and increasing its capacity to evaporate and absorb water or moisture from its surroundings. Dust is prevented from being deposited upon rollers 6 or upon pins 10 and journals 9 by the seepage of air from within the enclosure over these members to the outside. To insure a substantial continuance of the evaporation effect of the air and its movements over rollers 6 and board 28, auxiliary or boosting fans may be placed at convenient points within the enclosure, as for instance, fan 37 actuated by motor 38 and like motor 34 supported upon a convenient support 39.

Although the movement of air within the enclosure, in the preferred embodiment of the invention is in the same direction of movement as that of the finished board, it will be understood that the air stream may be caused to move in a direction counter-current to the movement of the board, and the same effect obtained provided the temperature of the air is regulated and controlled in such fashion that collection or condensation of moisture upon rollers 6 and the face of board 28 is prevented, thus preventing the entrainment or entanglement of dust thereon which, during the passage of the board over rollers 6 would cause marring, scratching, puncturing or other defacement of board 28 with the production of an excessive amount of seconds.

It will be seen from the foregoing, that an apparatus for, and method of manufacturing plaster board, including gypsum wall board, gypsum lath and the like, is provided wherein the speed of crystallization of the gypsum mix may be regulated, and wherein the injurious effects of dust deposition upon the face of the board is eliminated.

What is claimed is:

1. The method of preventing dust precipitation upon plaster board during its manufacture which comprises advancing the plaster board along a run-way extending between the means for fabricating the board and suitable drying means with the face of the board downward and passing a current of gas over the face of the board to cause evaporation of moisture therefrom and prevent the adherence of dust thereto and permitting the gas to flow and escape around the edges of the board.

2. The method of preventing dust precipitation upon plaster board during its manufacture which comprises advancing the plaster board along a run-way with the face of the board downward, subjecting the face of the board to elevated temperature during such advancing and passing a current of a gaseous medium over the face of the board to prevent collection of moisture upon the face of the board and adherence of dust thereto.

3. The method of preventing dust precipitation upon plaster board during its manufacture which comprises advancing the plaster board along a run-way with the face of the board downward, heating the face of the board and passing a current of air forwardly against and across said face to cause evaporation of moisture therefrom and prevent the adherence of dust thereto and permitting the gas to flow and escape around the edge of the board.

4. An apparatus for the production of plaster board comprising a runway elevated from the floor upon which the plaster board is moved in the course of its manufacture, an enclosure extending from the runway to the floor and forming, with the floor and the plaster board, a substantially closed compartment, an air filter positioned in an opening in said enclosure, and air circulating means positioned adjacent said filter for introducing filtered air into said compartment and maintaining a flow of air outward from the compartment at all other adventitious openings to prevent entry of dust particles into the compartment.

5. An apparatus for the production of plaster board comprising a runway elevated from the floor upon which the plaster board is moved in the course of its manufacture, an enclosure extending from the runway to the floor and forming, with the floor and the plaster board, a substantially closed compartment, heating means within the compartment, an air filter positioned in an opening in said enclosure, and air circulating means positioned adjacent said filter for introducing filtered air into said compartment to cause a pressure of heated air against the under side of the plaster board and maintain a flow of air outward from the compartment at all other adventitious openings to prevent entry of dust particles into the compartment.

6. The method of manufacturing plaster board which comprises receiving fabricated, undried boards from the fabricating machine and onto a substantially flat conveying means with the finish face of the plaster boards down, moving said boards along the run-way and simultaneously passing a current of air against and across the under face of said boards to cause evaporation of moisture from the surface thereof to prevent adherence of dust thereto and permitting the air to escape around the edges of the boards whereby the current of escaping air prevents entry of dust around said edges, and transferring said boards from said conveyor to suitable drying means after crystallization of the plaster has advanced to a point where the boards may be safely handled for completion of the drying process.

7. A method of preventing deposition of dust on the finish face of plaster wall board during manufacture which comprises advancing the plaster wall board along a run-way with the face of the board downward, subjecting the face of the board to elevated temperature during such advancement, and directing a current of filtered gaseous medium against and across the face of the board to prevent collection of moisture upon the face of the board and by said prevention and also because of the agitation of the air current prevent deposition of dust thereon.

DEAN D. CRANDELL.